(12) United States Patent
Okano

(10) Patent No.: US 9,930,244 B2
(45) Date of Patent: Mar. 27, 2018

(54) IMAGE CAPTURING SYSTEM IN WHICH OPTICAL ACCESSORY IS PLACEABLE IN FRONT OF LIGHT EMITTING UNIT, ILLUMINATION APPARATUS IN WHICH OPTICAL ACCESSORY IS PLACEABLE IN FRONT OF LIGHT EMITTING UNIT, AND METHOD FOR DETECTING FOCUS

(71) Applicant: CANON KABUSHIKI KAISHA, Tokyo (JP)

(72) Inventor: Yoshinobu Okano, Shiraoka (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/182,454

(22) Filed: Jun. 14, 2016

(65) Prior Publication Data
US 2016/0381279 A1 Dec. 29, 2016

(30) Foreign Application Priority Data
Jun. 25, 2015 (JP) ................................ 2015-128157

(51) Int. Cl.
  H04N 5/232 (2006.01)
  H04N 5/225 (2006.01)
  H04N 5/235 (2006.01)

(52) U.S. Cl.
  CPC ....... *H04N 5/23212* (2013.01); *H04N 5/2256* (2013.01); *H04N 5/2354* (2013.01)

(58) Field of Classification Search
  CPC .................................................. H04N 5/23212
  USPC ......................................................... 348/345
  See application file for complete search history.

(56) References Cited

U.S. PATENT DOCUMENTS

| 2008/0117325 A1* | 5/2008 | Nakagawa | G03B 13/36 348/345 |
| 2014/0375828 A1* | 12/2014 | Miller | H04N 1/00289 348/207.11 |

FOREIGN PATENT DOCUMENTS

JP   2002-139664 A   5/2002

\* cited by examiner

*Primary Examiner* — Usman Khan
(74) *Attorney, Agent, or Firm* — Canon U.S.A., Inc. IP Division

(57) ABSTRACT

An image capturing system includes an image capturing apparatus, a first light emitting unit, a second light emitting unit having a light coverage smaller than a light coverage of the first light emitting unit, and a control unit configured to perform control according to whether a predetermined optical accessory for the first light emitting unit is present in such a manner that, when focus detection is performed in the image capturing apparatus, one of the first light emitting unit and the second light emitting unit is used as a light emitting unit that emits assist light for the focus detection.

26 Claims, 7 Drawing Sheets

IMAGE CAPTURING SYSTEM IN WHICH OPTICAL ACCESSORY IS PLACEABLE IN FRONT OF LIGHT EMITTING UNIT, ILLUMINATION APPARATUS IN WHICH OPTICAL ACCESSORY IS PLACEABLE IN FRONT OF LIGHT EMITTING UNIT, AND METHOD FOR DETECTING FOCUS

BACKGROUND OF THE INVENTION

Field of the Invention

The present invention relates to an image capturing system that applies assist light to an image sensing field to detect focus, an illumination apparatus of the image capturing system, and a method for detecting focus in the image capturing system.

Description of the Related Art

There is a known technique in the related art for autofocusing (AF) in an image capturing apparatus while applying assist light (hereinafter referred to as AF assist light). Examples of a method for applying AF assist light include applying patterned LED light from an LED light source and applying flash light from a discharge tube of an illumination apparatus.

Japanese Patent Laid-Open No. 2002-139664 discloses a technique for controlling driving of a lens using the result of focus detection having higher reliability of the result of focus detection using flash assist light and the result of focus detection using LED assist light.

Although LED assist light is effective for low-contrast subjects because it is applied in a pattern, its coverage is limited as compared with flash assist light. In contrast, flash assist light has wide coverage and is therefore effective for a wide range in a photographing frame but is ineffective for low-contrast subjects. Thus, the technique disclosed in Japanese Patent Laid-Open No. 2002-139664 aims at enhancing AF accuracy in consideration of the advantages and disadvantages of the methods of radiation.

In photographing using an illumination apparatus, such as a flash unit, an optical filter and so on (hereinafter referred to as optical accessories) are sometimes disposed in front of a light emitting unit of the flash unit. Examples of the optical accessories include a color filter for adjusting the color temperature of radiated light to match the color of the subject to the color of the background (changing the chromatic characteristics of the light) during photographing under the light of an incandescent lamp (tungsten), a diffuser for scattering radiated light to attain soft lighting, with the light emitting unit oriented to the subject, and a wide panel that increases light distribution to cope with wide angle lenses.

The technique disclosed in Japanese Patent Laid-Open No. 2002-139664 does not allow for control of AF assist light when such optical accessories are used.

SUMMARY OF THE INVENTION

The present invention provides a technique for ensuring high AF accuracy even if optical accessories are used.

An image capturing system according to an aspect of the present invention is an image capturing system including an image capturing apparatus and a flash unit built in or attached to the image capturing apparatus. The flash unit includes a light emitting unit, a first assist-light emitting unit, and a detection unit. The light emitting unit emits flash light. The first assist-light emitting unit emits flash assist light for the image capturing apparatus to use in detecting focus to an image sensing field using the light emitting unit. The detection unit detects whether the light emitting unit is fitted with, for example, an optical filter. At least one of the image capturing apparatus and the flash unit includes a second assist-light emitting unit that emits LED assist light, which is second assist light, for the image capturing apparatus to use in detecting focus to the image sensing field. The image capturing apparatus includes a control unit. When the detection unit detects that the flash unit is fitted with an optical filter, the control unit selectively switches between emission of the flash assist light and emission of the LED assist light and applies the selected light to image sensing field.

Further features of the present invention will become apparent from the following description of exemplary embodiments with reference to the attached drawings.

DESCRIPTION OF THE EMBODIMENTS

Embodiments of the present invention will be described hereinbelow with reference to the attached drawings. In the embodiments, an image capturing system including a digital camera, which is an example of an image capturing apparatus, and an illumination apparatus detachably attached to the digital camera will be described.

Configuration of Digital Camera

Figure 1:
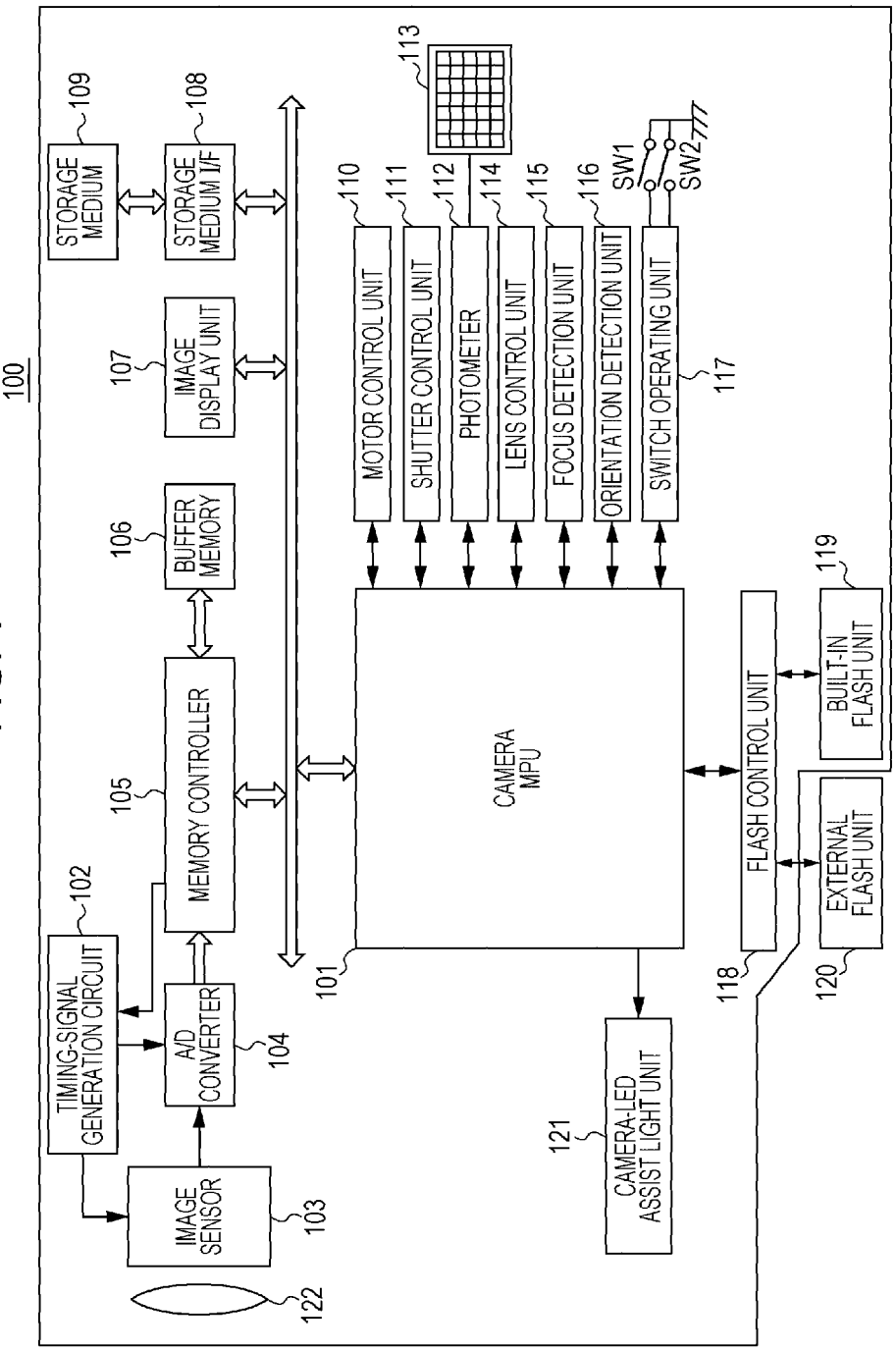
FIG. 1 is a block diagram illustrating, in outline, the configuration of a digital camera constituting an image capturing system according to an embodiment of the present invention.

FIG. 1 is a block diagram illustrating, in outline, the configuration of a digital camera 100 constituting an image capturing system according to an embodiment of the present invention.

The digital camera 100 includes a microprocessor 101, an imaging optical system 122, a timing-signal generation circuit 102, an image sensor 103, an analog-to-digital converter 104, a memory controller 105, a buffer memory 106, and an image display unit 107.

The microprocessor 101 (hereinafter referred to as "camera MPU 101") controls a photographing sequence and the overall operation of the image capturing system. The imaging optical system 122 includes a plurality of lenses, such as a zoom lens and a focus lens, a diaphragm, and a shutter and forms an optical image on the image sensor 103 from reflected light coming from a subject. The image sensor 103 is an image capturing element, such as a CCD and a CMOS, that converts an optical image of reflected light from a subject to an electrical signal. The timing-signal generation circuit 102 generates a timing signal necessary for operating the image sensor 103. The analog-to-digital converter 104 converts an analog electrical signal (analog image data) read from the image sensor 103 to a digital electrical signal (digital image data).

The memory controller 105 controls reading and writing to/from a memory (not shown), a refreshing operation on the buffer memory 106. The buffer memory 106 temporarily stores digital image data output from the analog-to-digital converter 104 and image data on an image to be displayed on the image display unit 107. The image display unit 107 includes a display, such as a liquid crystal panel and an organic electroluminescence (EL) panel, on which image data stored in the buffer memory 106 is displayed as images.

The digital camera 100 is configured such that a storage medium 109, such as a memory card, can be inserted therein and extracted therefrom and includes a storage medium I/F 108 for connected the inserted storage medium 109 to the camera MPU 101. The storage medium 109 may be a hard disk built in the digital camera 100.

The digital camera 100 further includes a motor control unit 110, a shutter control unit 111, a photometer 112, a multi-zone photometric sensor 113, a lens control unit 114, a focus detection unit 115, an orientation detection unit 116, and a switch operating unit 117. The digital camera 100 further includes a flash control unit 118, a built-in illumination apparatus 119 (a first light emitting unit, hereinafter referred to as "built-in flash unit 119"), and a camera LED assist light unit 121 (a second light emitting unit). An external illumination apparatus 120 (hereinafter referred to as "external flash unit 120") can be detachably attached to the digital camera 100.

The motor control unit 110 moves a mirror (not shown) up and down and charges a shutter of the imaging optical system 122 during an exposure operation by controlling a motor (not shown) according to a signal from the camera MPU 101. The shutter control unit 111 shuts power to the shutter (a shutter leading curtain and a shutter trailing curtain) according to a signal from the camera MPU 101 to move the shutter leading curtain and the shutter trailing curtain, thereby controlling the exposure operation.

The photometer 112 outputs the output of the multi-zone photometric sensor 113, in which the photographing frame is divided into a plurality of areas, to the camera MPU 101 as luminance signals of the individual areas in the photographing frame. The camera MPU 101 performs photometric operations to calculate an aperture value (AV), a time value (TV, or a shutter speed), and ISO (the sensitivity of the image sensor 103) for adjusting exposure on the basis of the luminance signals acquired from the photometer 112. The photometer 112 further outputs a luminance signal when the built-in flash unit 119 or the external flash unit 120 performs preflashing on the subject to the camera MPU 101 and calculates the amount of flash light (main flash) during main exposure (main image capturing).

The lens control unit 114 communicates with the camera MPU 101 via a lens mount contact (not shown) to operate a lens driving motor and a lens diaphragm motor (not shown) to adjust the focus of the imaging optical system 122 and control the diaphragm. The focus detection unit 115 has the function of detecting the defocus amount of the subject for autofocusing (AF) using a known phase-difference detection method or the like. The orientation detection unit 116 detects the tilt of the digital camera 100 relative to the direction of rotation about the optical axis of image capturing.

The switch operating unit 117 detects switching of a first switch (SW1) and switching of a second switch (SW2) and transmits the detection results to the camera MPU 101. The SW1 is turned on by a first stroke (half press) of a release button (not shown), and the camera MPU 101 starts AF and photometry in response to an ON signal of the SW1. The SW2 is turned on by a second stroke (full press) of the release button, and the camera MPU 101 starts an exposing operation in response to an ON signal of the SW2. The switch operating unit 117 detects another signal generated when an operating member (not shown) other than the SW1 and SW2 and transmits the signal to the camera MPU 101.

The flash control unit 118 controls emitting operation of the built-in flash unit 119 and the external flash unit 120 (preflashing, main flashing, and assist light emission) according to an instruction from the camera MPU 101. The camera LED assist light unit 121 applies near infrared light (LED assist light) having a predetermined pattern, as assist light for focus detection control of the focus detection unit 115, to the image sensing field.

The camera MPU 101 functions as an assist light control unit for controlling application of assist light to an image sensing field using the built-in flash unit 119 or the external flash unit 120 for focus detection on the basis of the output of a luminance signal from the photometer 112. Specifically, the camera MPU 101 instructs the built-in flash unit 119 or the external flash unit 120 via the flash control unit 118 to emit flash assist light. Alternatively, the camera MPU 101 instructs the camera LED assist light unit 121 or a flash-LED assist light unit 207 (see FIG. 2) of the external flash unit 120 to emit LED assist light via the flash control unit 118.

Configuration of External Flash Unit

Figure 2:
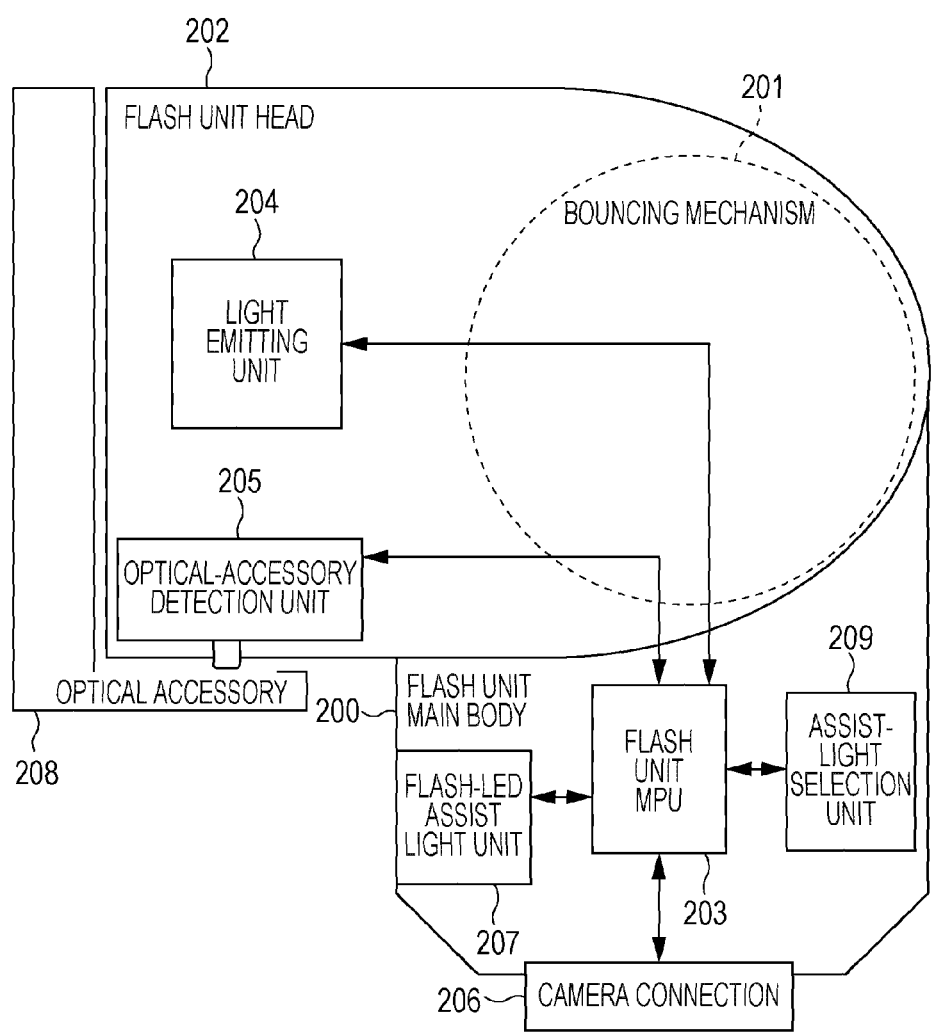
FIG. 2 is a block diagram illustrating, in outline, the configuration of an external flash unit which is detachably attached to the digital camera in FIG. 1 and which constitutes the image capturing system according to the embodiment of the present invention.

FIG. 2 is a block diagram illustrating, in outline, the configuration of the external flash unit 120 (an external illumination apparatus constituting the image capturing system). The external flash unit 120 includes a flash unit main body 200, a bouncing mechanism 201, and a flash unit head 202. The flash unit main body 200 includes a flash unit MPU 203, a camera connection 206, the flash-LED assist light unit 207 (a second light emitting unit), a main substrate (not shown) on which the flash unit MPU 203 is mounted, various operating units, such as a power switch, and a display.

The flash unit MPU 203 controls the overall operation of the external flash unit 120 including an emission control sequence of the external flash unit 120. The camera connection 206 mechanically and electrically connects the external flash unit 120 to the digital camera 100. The camera MPU 101 and the flash unit MPU 203 communicate with each other as necessary via the flash control unit 118 and the camera connection 206. Like the camera LED assist light unit 121 of the digital camera 100, the flash-LED assist light unit 207 applies, as assist light for detecting focus using the camera MPU 101 via the focus detection unit 115, LED assist light having a predetermined pattern, such as near infrared light, to the image sensing field.

The bouncing mechanism 201 has a known mechanism for rotating the flash unit head 202 relative to the flash unit main body 200 and includes a flash main capacitor (not shown) and so on. The bouncing mechanism 201 is a radiation-direction changing mechanism capable of changing the direction of radiation, which is known for general external flash units and which holds the flash unit head 202 so as to rotate in a horizontal direction and a vertical direction relative to the flash unit main body 200. Using the bouncing mechanism 201 allows flashing in different directions (hereinafter referred to as "bounce flash").

The flash unit head 202 includes a light emitting unit 204 (a first light emitting unit) that emits flash light and an optical-accessory detection unit 205. The light emitting unit 204 includes an electrical discharge tube, such as a xenon tube, which is necessary for emitting flash light, a light reflector, a Fresnel lens, and a flash emission circuit for emitting flash light in response to a light emission signal from the flash unit MPU 203. The optical-accessory detection unit 205 is formed of a mechanical switch and determines whether an optical accessory 208 is attached to the flash unit head 202. Examples of the optical accessory include a color filter, a diffuser, and a color wide panel.

This embodiment includes a plurality of mechanical switches to distinguish a plurality of kinds of optical accessory 208. The mechanical switches distinguish the kind of optical accessory 208 according to which of the plurality of mechanical switches is turned on when the optical accessory 208 is attached. A method for distinguishing the kind of optical accessory 208 is not limited to the above method; another method of distinction through wireless communication with the optical accessory 208 may be employed. As another alternative to the method for distinguishing the kind of optical accessory 208, the optical-accessory detection unit 205 may not be provided, and the user may input the kind of optical accessory 208 via an input device (not shown). Thus, any method for determining whether the optical accessory 208 is disposed in front of the light emitting unit 204 may be used.

The assist light selection unit 209 switches the order of priority of flash assist light and LED assist light according to a user operation. The flash assist light has large light coverage and is effective for a large area in a photographing frame but is ineffective for a low-contrast subject. In contrast, the LED assist light is applied in a pattern and is therefore effective for a low-contrast subject but has limited light coverage. Furthermore, the LED assist light is smaller in maximum amount of emission than the flash assist light. For this reason, this embodiment includes the assist light selection unit 209 to allow the user to freely switch assist light according to the conditions of image capturing.

Control of Image Capturing Operation of Image Capturing System

Figure 3:
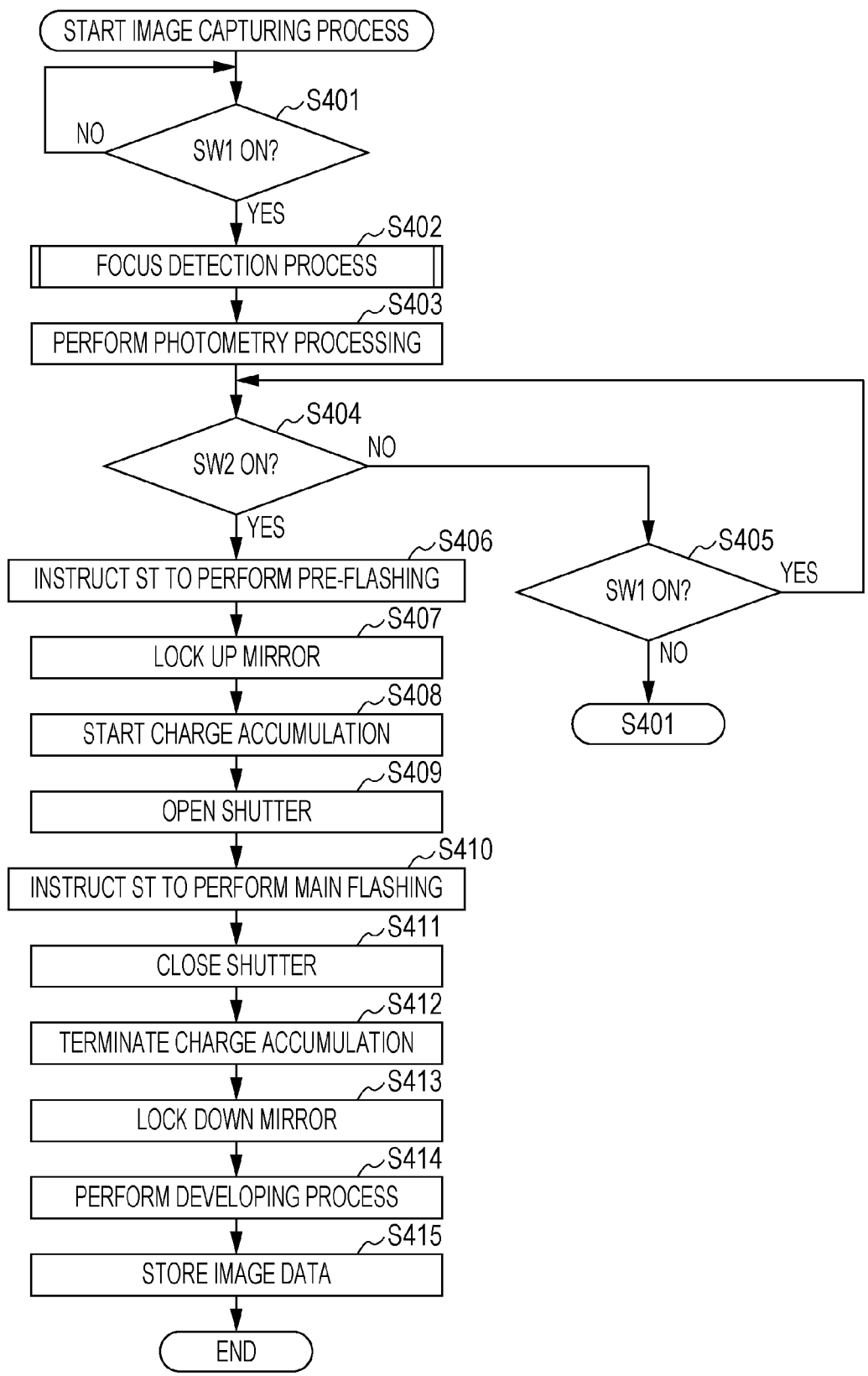
FIG. 3 is a flowchart of a procedure for image capturing performed by the image capturing system according to the embodiment of the present invention.

FIG. 3 is a flowchart of a procedure for image capturing performed by the image capturing system including the digital camera 100 and the external flash unit 120, illustrating an image capturing operation executed at the digital camera 100, with flash assist light selected. The processes shown in FIG. 3 are executed by the camera MPU 101 reading a control program from a ROM (not shown), expanding the program into a RAM (not shown), controlling the operations of the components of the digital camera 100, and instructing the external flash unit 120 to perform a predetermined operation. Reference sign "ST" in FIG. 3 denotes "external flash unit 120" and is used in the following all flowcharts.

At step S401, the camera MPU 101 determines the state of the SW1 of the switch operating unit 117 and waits until the SW1 is pressed (turned on) (NO at S401), and when the SW1 is pressed (YES at S401), the camera MPU 101 goes to step S402. At step S402, the camera MPU 101 performs a focus detection process. The focus detection process includes range finding using the focus detection unit 115 and an autofocusing operation for controlling the focus lens of the imaging optical system 122 to be positioned at an in-focus position using the lens control unit 114, during which assist light (flash assist light or LED assist light) is emitted. The details of the focus detection process at step S402 will be described later.

Subsequently, at step S403, the camera MPU 101 performs photometry processing using the photometer 112 to determine a shutter control value and a diaphragm control value according to a set image capturing mode. Thereafter, at step S404, the camera MPU 101 determines whether the SW2 of the switch operating unit 117 has been pressed (turned on). If the SW2 has not been pressed (NO at S404), the camera MPU 101 goes to step S405, and if the SW2 has been pressed (YES at S404), the camera MPU 101 goes to step S406. At step S405, the camera MPU 101 determines whether the SW1 has continuously been pressed, as at step S401. If the SW1 has been pressed (YES at S405), the camera MPU 101 returns to step S404, and if the SW1 has not been pressed (NO at S405), the camera MPU 101 returns to step S401.

At step S406, the camera MPU 101 instructs the flash unit MPU 203 of the external flash unit 120 to perform preflashing at a predetermined amount of light using the light emitting unit 204. When the external flash unit 120 executes preflashing according to this instruction, the camera MPU 101 calculates the amount of flash light during main exposure (main image capturing) on the basis of a luminance signal acquired during preflashing.

Next, at step S407, the camera MPU 101 performs mirror lock-up (an operation for retracting a mirror from an image capturing optical path) using the motor control unit 110. At that time, the motor control unit 110 locks the mirror up by controlling the operation of a motor (not shown). At step S408, the camera MPU 101 starts charge accumulation processing in the image sensor 103. Subsequently, at step S409, the camera MPU 101 opens a shutter using the shutter control unit 111. By moving the shutter of the imaging optical system 122 using the shutter control unit 111, exposure of the image sensor 103 is started.

Subsequently, at step S410, the camera MPU 101 instructs the flash unit MPU 203 to perform main flashing using the light emitting unit 204 at the amount of main flashing calculated at step S406. At step S410, the camera MPU 101 also performs an exposure operation at predetermined exposure values (AV, TV, and ISO) in synchronization with the main flashing.

Next, at step S411, the camera MPU 101 closes the shutter using the shutter control unit 111. By closing the shutter of the imaging optical system 122 using the shutter control unit 111, the exposure of the image sensor 103 ends. At the next step S412, the camera MPU 101 terminates the charge accumulation processing at the image sensor 103. Thereafter, at step S413, the camera MPU 101 performs mirror lock-down (an operation for returning the mirror to the image capturing optical path) using the motor control unit 110. At that time, the motor control unit 110 locks the mirror down by controlling the operation of the motor (not shown).

At step S414, the camera MPU 101 reads image signals from the image sensor 103 and temporarily stores image data processed by the analog-to-digital converter 104 in the buffer memory 106. Upon reading all image signals from the image sensor 103, the camera MPU 101 performs a predetermined developing process on the image signals to create image data. Subsequently, at step S415, the camera MPU 101 stores the image data created at step S414 in the storage medium 109 as an image file via the storage medium I/F 108. Thus, a series of image capturing processes ends.

Figure 4:
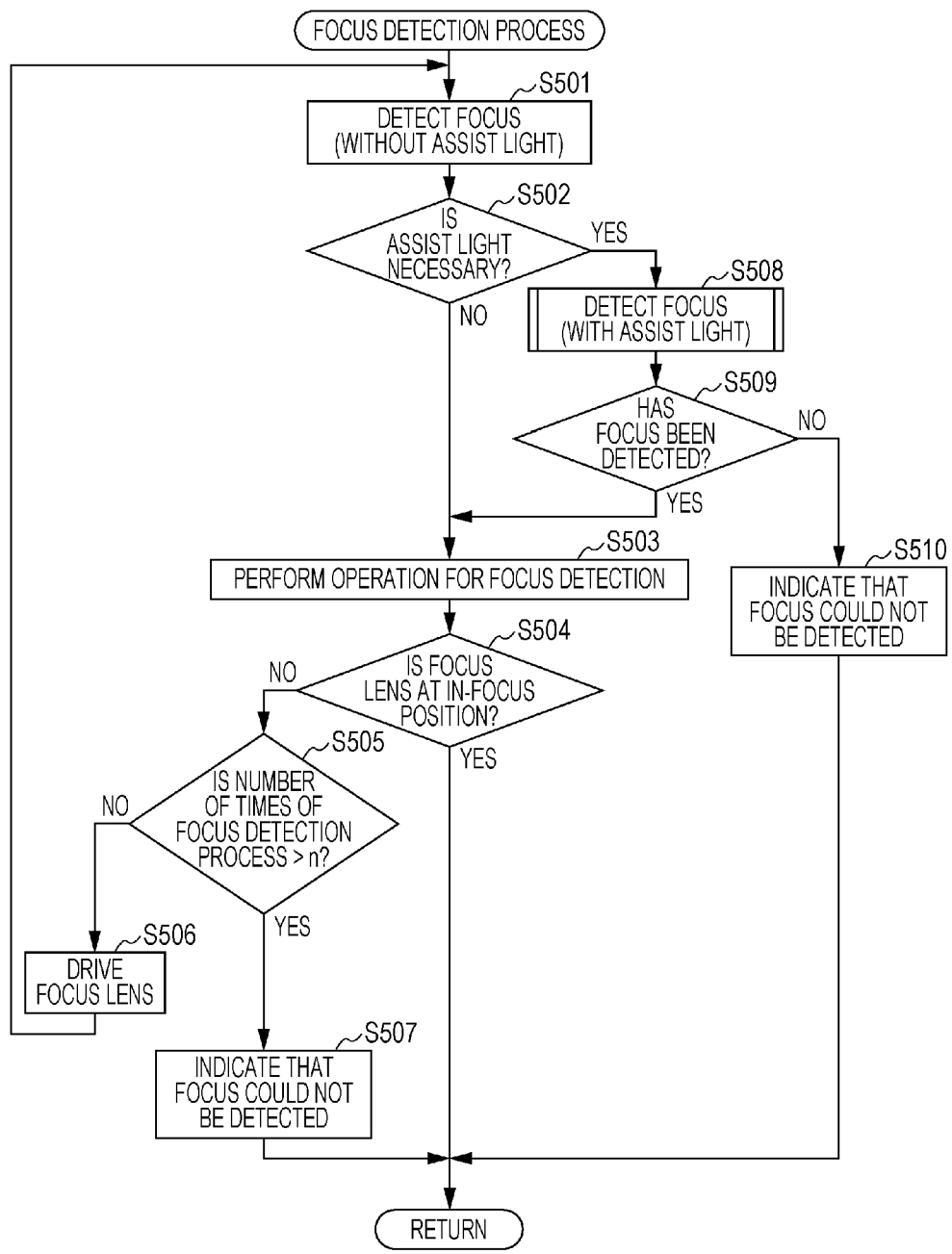
FIG. 4 is a flowchart of the focus detection process executed at step S402 in FIG. 3.

FIG. 4 is a flowchart of the focus detection process executed at step S402 of the flowchart in FIG. 3, which is executed at the digital camera 100. The processes in the flowchart of FIG. 4 are executed by the camera MPU 101 controlling the operations of the components of the digital camera 100 by reading a control program from the ROM (not shown), expanding the program into the RAM (not shown), and executing it.

In the focus detection process, first at step S501, the camera MPU 101 detects focus using the focus detection unit 115 without applying assist light. At the next step S502, the camera MPU 101 determines whether focus could be detected even without applying assist light. In other words, the camera MPU 101 determines whether application of assist light is needed to detect focus. If application of assist light is needed (YES at S502), the camera MPU 101 goes to step S508, and if application of assist light is not needed (NO at S502), the camera MPU 101 goes to step S503.

At step S503, the camera MPU 101 performs operations for focus detection using a signal acquired from a focus detection sensor (not shown) of the focus detection unit 115 to calculate a defocus amount, which is focus detection information corresponding to the driving amount of the focus lens. One example of the focus detection sensor is a line sensor composed of photoelectric conversion elements, such as a charge-coupled device (CCD). At that time, the camera MPU 101 corrects the defocus amount appropriately according to the kind of the method for detecting focus (the kind of the light source).

Subsequently, at step S504, the camera MPU 101 determines whether the focus lens needs to be driven, that is, whether the focus lens is at an in-focus position, on the basis of the calculation result acquired at step S503. If the defocus amount is smaller than a predetermined value, the camera MPU 101 determines that the focus lens is at the in-focus position, and if the focus lens is at the in-focus position (YES at S504), the camera MPU 101 terminates the process. In contrast, if the focus lens is not at the in-focus position (NO at S504), then the camera MPU 101 goes to step S505.

At step S505, the camera MPU 101 determines whether the number of times of focus detection process is larger than a predetermined number (n: a natural number). If the number of times of focus detection process is within the predetermined number (NO at S505), the camera MPU 101 goes to step S506, and if the number of times of focus detection process exceeds the predetermined number (YES at S505), the camera MPU 101 goes to step S507. At step S506, the camera MPU 101 instructs the lens control unit 114 on the driving amount of the focus lens on the basis of the calculation result at step S503, and the focus lens is driven according to the amount. Subsequently, the camera MPU 101 returns to step S501 to determine whether the focus lens has reached the in-focus position. In contrast, at step S507, the camera MPU 101 indicates on a display (not shown), such as an LED, that focus could not be detected and terminates this process.

At step S508, the camera MPU 101 detects focus using the focus detection unit 115 while applying assist light to the subject from the external flash unit 120 using the flash control unit 118. The details of the focus detection process using assist light at step S508 will be described later. At the next step S509, the camera MPU 101 determines whether focus could be detected. If focus could be detected (YES at S509), the camera MPU 101 goes to step S503, and if focus could not be detected (NO at S509), the camera MPU 101 goes to step S510. At step S510, the camera MPU 101 indicates on a display (not shown), such as a LED, that focus could not be detected, as at step S507, and terminates the process.

Figure 5A:
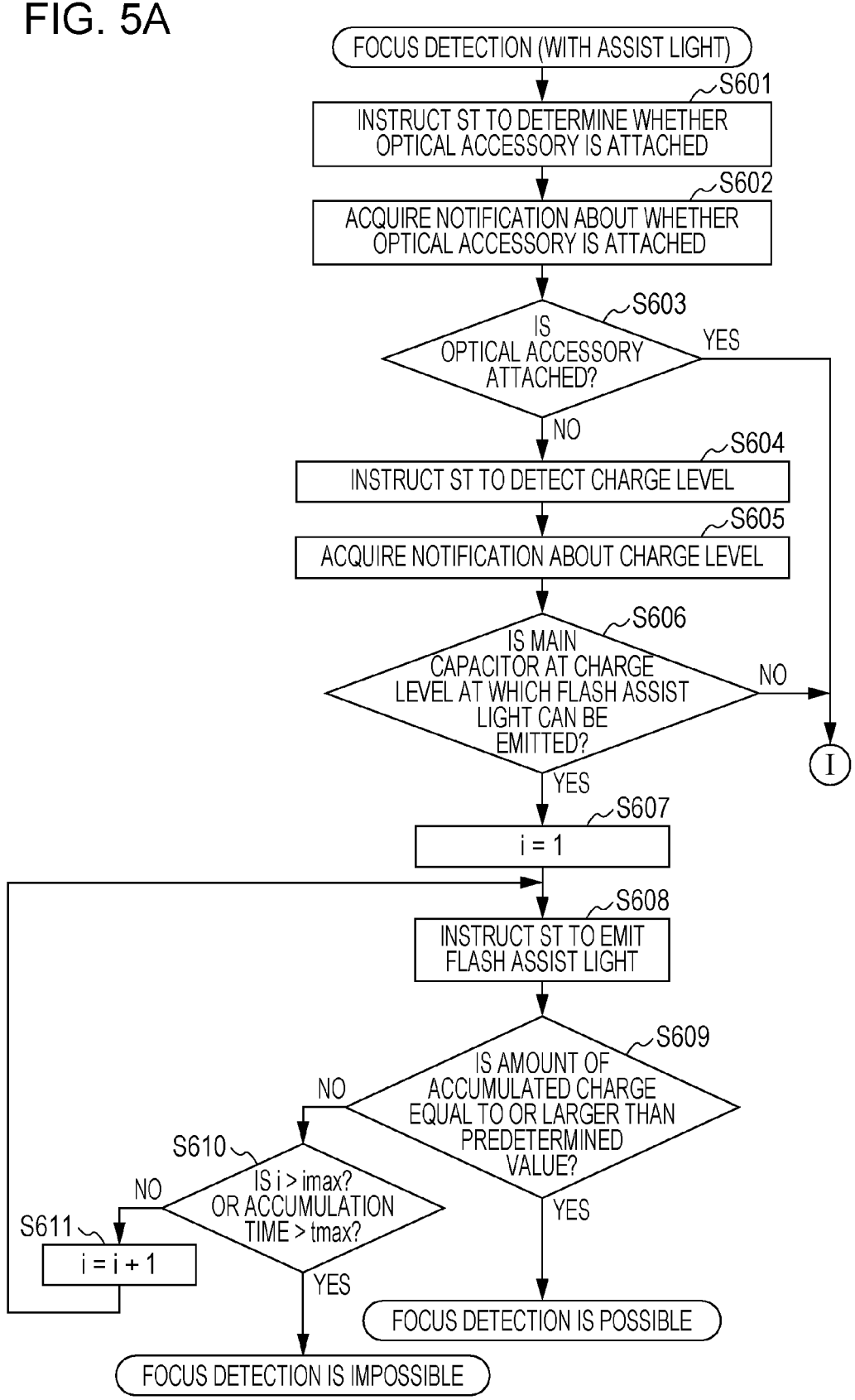
FIG. 5A is a flowchart of the focus detection process executed at step S508 in FIG. 4.
Figure 5B:
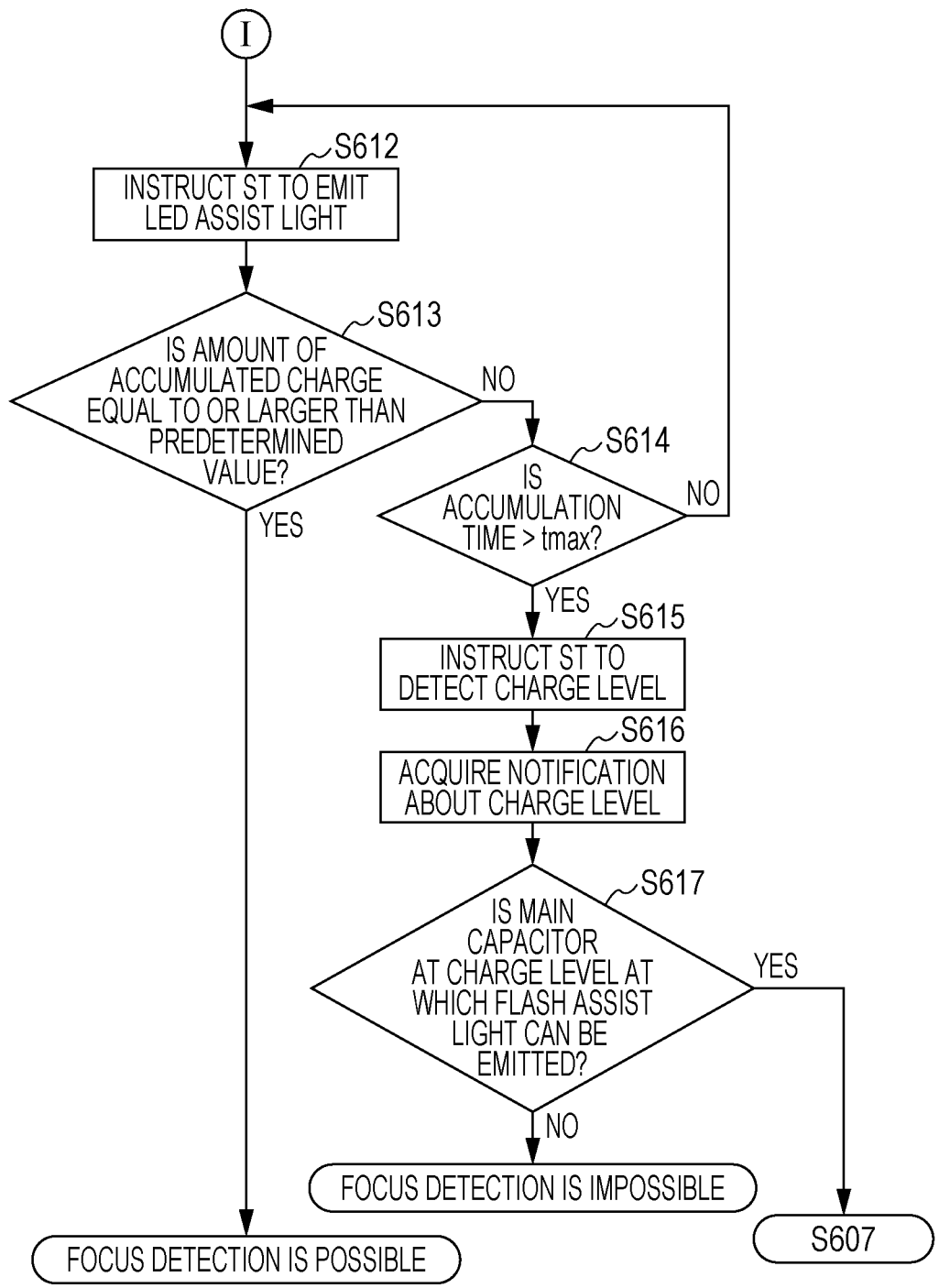
FIG. 5B is a flowchart of the focus detection process executed at step S508 in FIG. 4.

FIGS. 5A and 5B are flowcharts of the focus detection process executed at step S508 in FIG. 4, which is executed at the digital camera 100. The processes of the flowchart in FIGS. 5A and 5B are executed by the camera MPU 101 reading a control program from the ROM (not shown), expanding the program into the RAM (not shown), and controlling the operations of the components of the digital camera 100. In this focus detection process, roughly speaking, emission of flash assist light and emission of LED assist light are selectively switched according to whether the optical accessory 208 is attached to the flash unit head 202 (the state of attachment).

First, at step S601, the camera MPU 101 instructs the flash unit MPU 203 of the external flash unit 120 to determine using the optical-accessory detection unit 205 whether the optical accessory 208 is attached and to send a notification on the detection result. Thus, at step S602, the camera MPU 101 acquires the notification on the state of attachment of the optical accessory 208 (a notification at step S703 in FIG. 6, described later) sent from the flash unit MPU 203.

Subsequently, at step S603, the camera MPU 101 determines whether the notification on the state of attachment of the optical accessory 208, which is acquired at step S602, indicates that the flash unit head 202 is fitted with the optical accessory 208. In other words, at step S603, the camera MPU 101 determines whether a predetermined optical accessory 208 for the light emitting unit 204 is present. If the flash unit head 202 is fitted with the optical accessory 208, that is, if a predetermined optical accessory 208 for the light emitting unit 204 is present (YES at S603), then the camera MPU 101 goes to step S612. If the flash unit head 202 is not fitted with the optical accessory 208, that is, a predetermined optical accessory 208 for the light emitting unit 204 is not present (NO at S603), the camera MPU 101 goes to step S604.

If flash assist light is applied, with the optical accessory 208 attached to the flash unit head 202, the spectral characteristics of the flash assist light change. This interferes with proper focus detection, causing out-of-focus. Furthermore, emission of flash assist light in such a state in which proper focus detection cannot be performed will wastefully consume power. Furthermore, to perform photographing with flashing, which is the original purpose, after flash assist light is emitted, it is necessary to wait until the capacitor of the external flash unit 120 is fully charged with electrical energy. For this reason, performing release processing during accumulation of electrical energy will cause a delay in release. Thus, this embodiment prevents the above problem by emitting LED assist light when the flash unit head 202 is fitted with the optical accessory 208 (YES at S603).

At step S604, the camera MPU 101 instructs the flash unit MPU 203 to detect the charge level of the flash main capacitor and to send a notification on the detection result. Thus, at step S605, the camera MPU 101 acquires the notification on the charge level of the flash main capacitor sent from the flash unit MPU 203 (a notification at step S705 in FIG. 6, described later). Subsequently, at step S606, the camera MPU 101 determines on the basis of the notification on the charge level acquired at step S605 whether the flash main capacitor is at a charge level at which flash assist light in addition to flash light for photographing can be emitted. If the flash main capacitor is at a charge level at which flash assist light can be emitted (YES at S606), the camera MPU 101 goes to step S607. If the flash main capacitor is at a charge level at which flash assist light cannot be emitted (NO at S606), the camera MPU 101 goes to step S612.

If it is determined at step S603 and step S606 that there is no problem in emitting flash assist light, the camera MPU 101 goes to a focus detection process using flash assist light of steps S607 to S611. At step S607, the camera MPU 101 clears a counter (not shown) for storing the number of times of application of flash assist light to initialize the value (i=1). At the next step S608, the camera MPU 101 instructs the flash unit MPU 203 to emit flash assist light. After flash assist light is emitted by the light emitting unit 204 in response to the instruction, the camera MPU 101 determines at step S609 whether the amount of charge accumulated in the focus detection sensor of the focus detection unit 115 is equal to or larger than a predetermined value. If the amount of accumulated charge is equal to or larger than the predetermined value (YES at S609), the camera MPU 101 determines that the probability that calculation for focus detection is possible (focus detection is possible) is sufficiently high and terminates the focus detection process. Thus, the process goes to step S503. If the amount of accumulated charge is less than the predetermined value (NO at S609), the camera MPU 101 goes to step S610.

At step S610, the camera MPU 101 determines whether the number of times of application, i, has reached a predetermined maximum number imax and determines whether a charge accumulation time for focus detection has reached a predetermined maximum time tmax. If the number of times of application, i, is larger than the maximum number imax or the charge accumulation time has reached the maximum time tmax (YES at S610), the camera MPU 101 determines that focus cannot be detected (focus detection is impossible) and terminates the process. Thus, the process goes to step S510. If the number of times of application, i, is equal to or smaller than the maximum number imax, and if the charge accumulation time has not reached the maximum time tmax (NO at S610), the camera MPU 101 goes to step S611. At step S611, the camera MPU 101 increases the number of times of application, i, and returns to step S608. Thus, the application of flash assist light to the image sensing field is repeated, and focus detection is continued.

If at step S603 and step S606 it is not determined that there is no problem in emitting flash assist light, the camera MPU 101 goes to a focus detection process using LED assist light of steps S612 to S614. At step S612, the camera MPU 101 instructs the flash unit MPU 203 to emit LED assist light using the flash-LED assist light unit 207. When LED assist light is emitted by the flash-LED assist light unit 207 in response to the instruction, the camera MPU 101 determines at step S613 whether the amount of charge accumulated in the focus detection sensor during application of LED assist light is equal to or larger than a predetermined value. If the amount of accumulated charge is equal to or larger than the predetermined value (YES at S613), the camera MPU 101 determines that the probability that calculation for focus detection is possible (focus detection is possible) is sufficiently high and terminates the focus detection process. Thus, the process goes to step S503. In contrast, the amount of accumulated charge is less than the predetermined value (NO at S613), the camera MPU 101 goes to step S614.

At step S614, the camera MPU 101 determines whether the charge accumulation time for focus detection has reached the maximum time tmax. If the charge accumulation time has not reached the maximum time tmax (NO at S614), the camera MPU 101 returns to step S612 to continue emission of LED assist light using the flash-LED assist light unit 207, thus continuing the focus detection. In contrast, if the charge accumulation time has reached the maximum time tmax (YES at S614), the camera MPU 101 terminates the emission of LED assist light using the flash-LED assist light unit 207 and goes to step S615.

At steps S615 and S616, the camera MPU 101 inquires the charge level of the flash main capacitor from the flash unit MPU 203, as at steps S604 and S605, to acquire information on the charge level. Therefore, a repeated description will be omitted.

At step S617, the camera MPU 101 determines on the basis of the notification on the charge level acquired at step S616, whether the flash main capacitor is at a charge level at which flash assist light can be emitted, as in the process of step S606. If the flash main capacitor is at a charge level at which flash assist light can be emitted (YES at S617), the camera MPU 101 returns to step S607, and the process for emitting flash assist light is performed. In contrast, if the flash main capacitor is at a charge level at which flash assist light cannot be emitted (NO at S617), the camera MPU 101 determines that focus detection using flash assist light is impossible (focus detection is impossible) and terminates the process, and thus the process goes to step S510.

Figure 6:
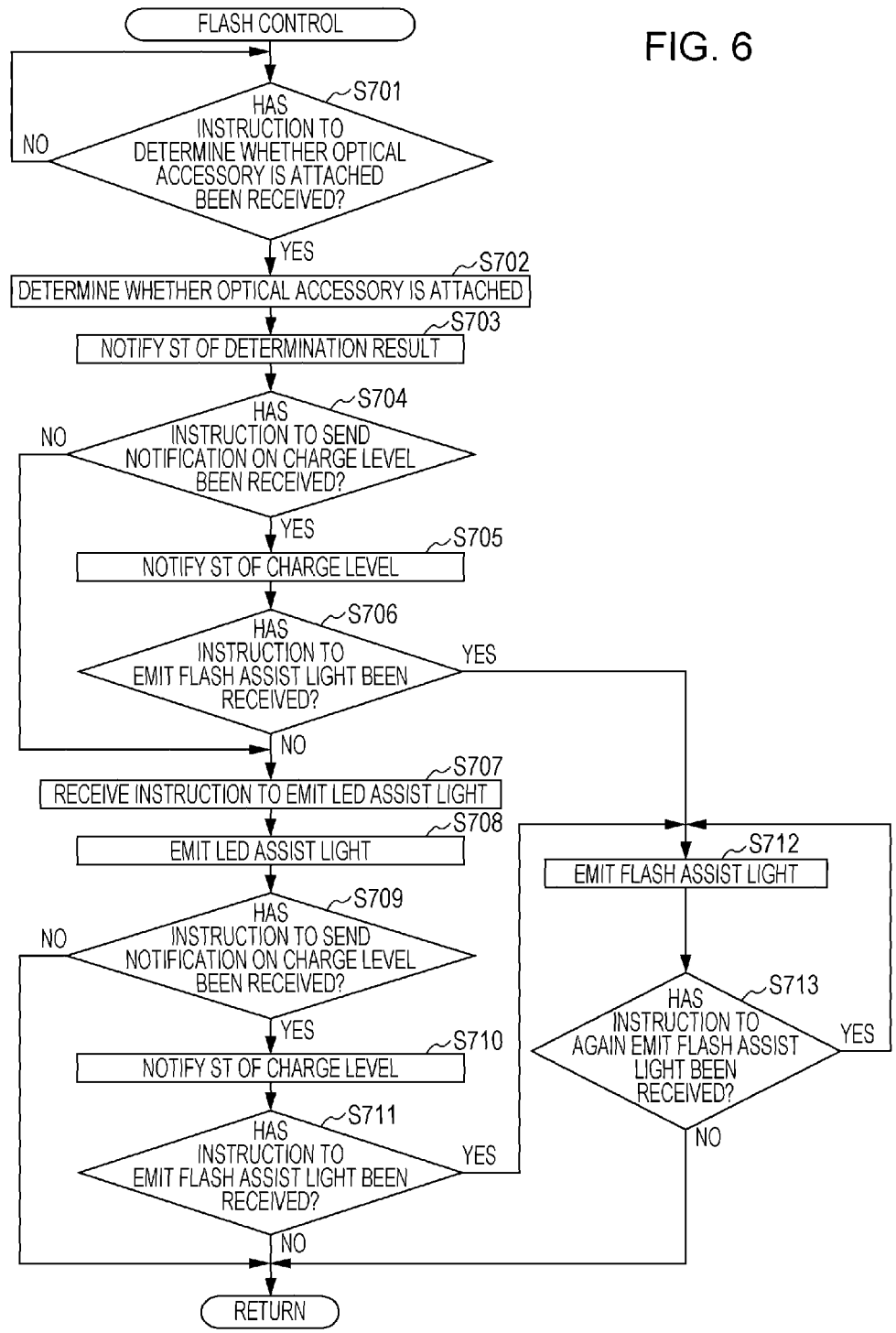
FIG. 6 is a flowchart of the process of applying assist light at the external flash unit, which proceeds in parallel with the focus detection process of step S508 in FIG. 4.

FIG. 6 is a flowchart of the process of applying assist light at the external flash unit 120, which proceeds in parallel with the focus detection process of step S508 at the digital camera 100. The processes of the flowchart in FIG. 6 are executed by the flash unit MPU 203 reading a control program from the ROM (not shown), expanding the program to the RAM (not shown), and controlling the operations of the components of the external flash unit 120.

At step S701, the flash unit MPU 203 determines whether an instruction to detect the optical accessory 208 has been received from the camera MPU 101 of the digital camera 100 and waits until an instruction to detect the optical accessory 208 is received (NO at S701). Upon receiving an instruction to detect the optical accessory 208 (YES at S701), the flash unit MPU 203 goes to step S702. At step S702, the flash unit MPU 203 detects whether the flash unit head 202 is fitted with the optical accessory 208 using the optical-accessory detection unit 205. Subsequently, at step S703, the flash unit MPU 203 notifies the camera MPU 101 of the state of attachment of the optical accessory 208.

Next at step S704, the flash unit MPU 203 determines whether an instruction to send a notification on the charge level has been received from the camera MPU 101. If the instruction to send a notification on the charge level has been received (YES at S704), the flash unit MPU 203 goes to step S705, and if the instruction to send a notification on the charge level has not been received (NO at S704), the flash unit MPU 203 goes to step S707. The case where the instruction to send a notification on the charge level has not been received at S704 indicates that the camera MPU 101 selects emission of LED assist light at step S603 and goes to step S612.

At step S705, the flash unit MPU 203 detects whether the flash main capacitor is at a charge level at which flash assist light can be emitted and notifies the camera MPU 101 of the result of detection of the charge level. At step S706, the flash unit MPU 203 determines whether an instruction to emit flash assist light has been received from the camera MPU 101. If the instruction to emit flash assist light has been received (YES at S706), the flash unit MPU 203 goes to step S712, and if the instruction to emit flash assist light has not been received (NO at S706), the flash unit MPU 203 goes to step S707.

At step S707, the flash unit MPU 203 receives an instruction to emit LED assist light (the emission instruction at step S612) from the camera MPU 101. The instruction to emit LED assist light is received when the camera MPU 101 is notified at step S703 that the external flash unit 120 is fitted with the optical accessory 208 or when the camera MPU 101 is notified at step S705 that the flash main capacitor is not at a charge level at which flash assist light can be emitted. In this case, the camera MPU 101 selects LED assist light emission at step S603 and goes to step S612, which leads to the process at step S707.

At step S708, the flash unit MPU 203 instructs the flash-LED assist light unit 207 to emit LED assist light to the image sensing field. Subsequently, at step S709, the flash unit MPU 203 determines whether an instruction to send a notification on the charge level has been received from the camera MPU 101, as at step S704. If the instruction to send a notification on the charge level has been received (YES at S709), the flash unit MPU 203 goes to step S710, and if the instruction to send a notification on the charge level has not been received (NO at S709), the flash unit MPU 203 terminates the process. The instruction to send a notification on the charge level is issued when focus detection cannot be performed using LED assist light. The instruction to send a notification on the charge level is not issued when focus detection can be performed using LED assist light, and therefore the focus detection process is terminated.

At step S710, the flash unit MPU 203 detects weather the flash main capacitor is at a charge level at which flash assist light can be emitted and notifies the camera MPU 101 of the result of detection of the charge level, as at step S705. At step S711, the flash unit MPU 203 determines whether an instruction to emit flash assist light has been received from the camera MPU 101, as at step S706. If an instruction to emit flash assist light has been received (YES at S711), the flash unit MPU 203 goes to step S712, and if an instruction to emit flash assist light has not been received (NO at S711), the flash unit MPU 203 terminates the process.

At step S712, the flash unit MPU 203 emits flash assist light using the light emitting unit 204. Subsequently, at step S713, the flash unit MPU 203 determines again whether an instruction to emit flash assist light has been received from the camera MPU 101. If an instruction to emit flash assist light has been received (YES at S713), the flash unit MPU 203 returns to step S712, and if an instruction to emit flash assist light has not been received (NO at S713), the flash unit MPU 203 terminates the process.

Thus, in the control method described above, when the external flash unit 120 is fitted with the optical accessory 208, LED assist light is used instead of flash assist light that causes out-of-focus, so that wasteful power consumption is reduced, and a delay in release is reduced. Although in the above control method flash assist light emitted by the light emitting unit 204 of the external flash unit 120 is switched to LED assist light emitted by the flash-LED assist light unit 207, the flash assist light may be switched to LED assist light emitted by the camera LED assist light unit 121. This offers the same advantageous effects. It may only be required that flash assist light is not used when the external flash unit 120 is fitted with the optical accessory 208.

LED assist light generally has lower intensity than flash assist light, so that a region in which the LED assist light effectively functions as AF assist light is limited to the vicinity of the center of the shooting region and to a close range. For this reason, when the external flash unit 120 is fitted with the optical accessory 208, not only flash assist light but also LED assist light may not be emitted. By emitting none of the assist lights, wasteful power consumption is further reduced.

In the above embodiment, the camera MPU 101 transmits an instruction to emit flash assist light or an instruction to emit LED assist light to the flash unit MPU 203 according to the state of attachment of the optical accessory 208 to the flash unit head 202. However, another configuration may be employed in which the flash unit MPU 203 determines which of flash assist light and LED assist light is to be emitted according to the state of attachment of the optical accessory 208 to the flash unit head 202. In this configuration, when the flash unit MPU 203 receives an instruction to emit assist light from the camera MPU 101, the flash unit MPU 203 determines which of flash assist light and LED assist light is to be emitted according to the state of attachment of the optical accessory 208 to the flash unit head 202. The determination of which of flash assist light and LED assist light is to be emitted may be made with consideration of the charge level of the flash main capacitor.

Although the above embodiment has a configuration in which the optical accessory 208 is attached to the flash unit head 202 of the external flash unit 120, the optical accessory 208 may be attached in front of a light emitting unit of the built-in flash unit 119. Also in this configuration, the camera MPU 101 may transmit an instruction to emit flash assist light or an instruction to emit LED assist light to the flash control unit 118 according to the state of attachment of the optical accessory 208 to the light emitting unit of the built-in flash unit 119.

Having described the present invention in detail as related to the embodiments, It will be obvious to those skilled in the art that the present invention is not limited to the specific embodiments but may include various forms within the scope of the present invention. It will also be obvious to those skilled in the art that the above embodiments are given for mere illustration; the embodiments may be combined as appropriate.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™, a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-128157, filed Jun. 25, 2015, which is hereby incorporated by reference herein in its entirety.

What is claimed is:

1. An image capturing system comprising:
an image capturing apparatus;
a first light emitting unit;
a second light emitting unit having a light coverage smaller than a light coverage of the first light emitting unit; and
a processor configured to perform control according to whether a predetermined optical accessory for the first light emitting unit is present in front of the first light emitting unit in such a manner that, when focus detection is performed in the image capturing apparatus, one of the first light emitting unit and the second light emitting unit is used as a light emitting unit that emits assist light for the focus detection.

2. The image capturing system according to claim 1, wherein the processor performs control in such a manner that, when the predetermined optical accessory is present in front of the first light emitting unit, the second light emitting unit is used as a light emitting unit that emits assist light when focus detection is performed in the image capturing apparatus.

3. The image capturing system according to claim 1, wherein the processor performs control in such a manner that, when the predetermined optical accessory is present in front of the first light emitting unit, the first light emitting unit does not emit assist light when focus detection is performed in the image capturing apparatus.

4. The image capturing system according to claim 1, wherein the predetermined optical accessory comprises a filter that changes chromatic characteristics of light emitted from the first light emitting unit.

5. The image capturing system according to claim 1, wherein the predetermined optical accessory comprises a diffuser.

6. The image capturing system according to claim 1, wherein the predetermined optical accessory comprises an optical panel that increases a light coverage of the first light emitting unit.

7. The image capturing system according to claim 1, further comprising an illumination apparatus,
wherein the illumination apparatus comprises the first light emitting unit and the second light emitting unit.

8. The image capturing system according to claim 1, further comprising an illumination apparatus,
wherein the illumination apparatus comprises the first light emitting unit, and
wherein the image capturing apparatus comprises the second light emitting unit.

9. An image capturing system comprising:
an image capturing apparatus;
a first light emitting unit;
a second light emitting unit configured to emit light having a maximum intensity lower than an intensity of the first light emitting unit; and
a processor configured to perform control according to whether a predetermined optical accessory for the first light emitting unit is present in front of the first light emitting unit in such a manner that, when focus detection is performed in the image capturing apparatus, one of the first light emitting unit and the second light emitting unit is used as a light emitting unit that emits assist light for the focus detection.

10. The image capturing system according to claim 9, wherein the processor performs control in such a manner that, when the predetermined optical accessory is present in front of the first light emitting unit, the second light emitting unit is used as a light emitting unit that emits assist light when focus detection is performed in the image capturing apparatus.

11. The image capturing system according to claim 9, wherein the processor performs control in such a manner that, when the predetermined optical accessory is present in front of the first light emitting unit, the first light emitting unit does not emit assist light when focus detection is performed in the image capturing apparatus.

12. The image capturing system according to claim 9, wherein the predetermined optical accessory comprises a filter that changes chromatic characteristics of light emitted from the first light emitting unit.

13. The image capturing system according to claim 9, wherein the predetermined optical accessory comprises a diffuser.

14. The image capturing system according to claim 9, wherein the predetermined optical accessory comprises an optical panel that increases a light coverage of the first light emitting unit.

15. The image capturing system according to claim 9, further comprising an illumination apparatus,
wherein the illumination apparatus comprises the first light emitting unit and the second light emitting unit.

16. The image capturing system according to claim 9, further comprising an illumination apparatus,
wherein the illumination apparatus comprises the first light emitting unit, and
wherein the image capturing apparatus comprises the second light emitting unit.

17. An image capturing system comprising:
an image capturing apparatus;
a first light emitting unit;
a second light emitting unit having a light coverage smaller than a light coverage of the first light emitting unit; and
a processor configured to perform control in such a manner that, when a predetermined optical accessory for the first light emitting unit is present in front of the first light emitting unit, the first light emitting unit does not emit assist light when focus detection is performed in the image capturing apparatus, wherein the assist light is light that assists the focus detection.

18. An image capturing system comprising:
an image capturing apparatus;
a first light emitting unit;
a second light emitting unit configured to emit light having a maximum intensity lower than an intensity of the first light emitting unit; and
a processor configured to perform control in such a manner that, when a predetermined optical accessory for the first light emitting unit is present in front of the first light emitting unit, the first light emitting unit does not emit assist light when focus detection is performed in the image capturing apparatus, wherein the assist light is light that assists the focus detection.

19. An illumination apparatus comprising:
a first light emitting unit;

a second light emitting unit having a light coverage smaller than a light coverage of the first light emitting unit; and a processor configured to perform control according to whether a predetermined optical accessory for the first light emitting unit is present in front of the first light emitting unit in such a manner that, when focus detection is performed in an image capturing apparatus, one of the first light emitting unit and the second light emitting unit is used as a light emitting unit that emits assist light for the focus detection.

20. An illumination apparatus comprising:

a first light emitting unit;

a second light emitting unit configured to emit light having a maximum intensity lower than an intensity of the first light emitting unit; and a processor configured to perform control according to whether a predetermined optical accessory for the first light emitting unit is present in front of the first light emitting unit in such a manner that, when focus detection is performed in an image capturing apparatus, one of the first light emitting unit and the second light emitting unit is used as a light emitting unit that emits assist light for the focus detection.

21. An illumination apparatus comprising:

a first light emitting unit;

a second light emitting unit having a light coverage smaller than a light coverage of the first light emitting unit; and a processor configured to perform control in such a manner that, when a predetermined optical accessory for the first light emitting unit is present in front of the first light emitting unit, the first light emitting unit does not emit assist light when focus detection is performed in an image capturing apparatus, wherein the assist light is light that assists the focus detection.

22. An illumination apparatus comprising:

a first light emitting unit;

a second light emitting unit configured to emit light having a maximum intensity lower than an intensity of the first light emitting unit; and a processor configured to perform control in such a manner that, when a predetermined optical accessory for the first light emitting unit is present in front of the first light emitting unit, the first light emitting unit does not emit assist light when focus detection is performed in an image capturing apparatus, wherein the assist light is light that assists the focus detection.

23. A method for detecting focus in an image capturing system comprising an image capturing apparatus, a first light emitting unit, and a second light emitting unit having a light coverage smaller than a light coverage of the first light emitting unit, the method comprising:

performing control according to whether a predetermined optical accessory for the first light emitting unit is present in front of the first light emitting unit in such a manner that, when focus detection is performed in the image capturing apparatus, one of the first light emitting unit and the second light emitting unit is used as a light emitting unit that emits assist light for the focus detection.

24. A method for detecting focus in an image capturing system comprising an image capturing apparatus, a first light emitting unit, and a second light emitting unit configured to emit light having a maximum intensity lower than an intensity of the first light emitting unit, the method comprising:

performing control according to whether a predetermined optical accessory for the first light emitting unit is present in front of the first light emitting unit in such a manner that, when focus detection is performed in the image capturing apparatus, one of the first light emitting unit and the second light emitting unit is used as a light emitting unit that emits assist light for the focus detection.

25. A method for detecting focus in an image capturing system comprising an image capturing apparatus, a first light emitting unit, and a second light emitting unit having a light coverage smaller than a light coverage of the first light emitting unit, the method comprising:

when a predetermined optical accessory for the first light emitting unit is present in front of the first light emitting unit, emitting no assist light using the first light emitting unit when focus detection is performed in the image capturing apparatus, wherein the assist light is light that assists the focus detection.

26. A method for detecting focus in an image capturing system comprising an image capturing apparatus, a first light emitting unit, and a second light emitting unit configured to emit light having a maximum intensity lower than an intensity of the first light emitting unit, the method comprising:

when a predetermined optical accessory for the first light emitting unit is present in front of the first light emitting unit, emitting no assist light using the first light emitting unit when focus detection is performed in the image capturing apparatus, wherein the assist light is light that assists the focus detection.

* * * * *